| [72] | Inventor | George Baum |
| | | Corning, N.Y. |
| [21] | Appl. No. | 46,315 |
| [22] | Filed | June 15, 1970 |
| [45] | Patented | Jan. 4, 1972 |
| [73] | Assignee | Corning Glass Works |
| | | Corning, N.Y. |

[54] ELECTRODE SENSITIVE TO CHOLINE AND ITS ESTERS AND METHODS USING SAID ELECTRODE
15 Claims, 4 Drawing Figs.

[52] U.S. Cl. .................................................. 204/1 T, 195/103.5, 204/195, 260/567.6 M
[51] Int. Cl. ....................................................... G01n 27/00, G01n 27/30
[50] Field of Search ............................................. 204/195 L, 1 T; 324/29; 195/103.5

[56] References Cited
UNITED STATES PATENTS

| 3,406,102 | 10/1968 | Frant et al. .................. | 204/1 T |
| 3,445,365 | 5/1969 | Ross ............................. | 204/195 |
| 3,448,032 | 6/1969 | Setzo et al. .................. | 204/195 |

Primary Examiner—G. L. Kaplan
Attorneys—Clarence R. Patty, Jr. and Gerhard K. Adam ABSTRACT: An electrode for measuring the concentration of cations of choline and its esters in an aqueous solution wherein the sensing portion is a liquid organic phase containing a substituted tetraphenylborate dissolved in a suitable organic solvent.

[11] 3,632,483

PATENTED JAN 4 1972

INVENTOR.
George Baum
BY
Gerhard K. Adam
ATTORNEY

ELECTRODE SENSITIVE TO CHOLINE AND ITS ESTERS AND METHODS USING SAID ELECTRODE

Choline is trimethyl(2-hydroxyethyl)ammonium hydroxide and may be represented by the formula $[(CH_3)_3NCH_2CH_2OH]^+OH^-$. It is an important nutritional substance required in the diet as a constituent of certain phospholipids. Choline is very soluble in water and is absolute alcohol. It is stable in dilute solutions, but in concentrated solutions it tends to decompose at a temperature of 100° C. Frequently choline is used in the form of its salts, one of the most common being the chloride $[(CH_3)_3NCH_2CH_2OH]^+CL^-$. The esters of choline are of great physiological interest, especially acetylcholine $[(CH_3)_3NCH_2CH_2OOCCH_3]+OH^-$ which appears to be essential in the transmission of nerve impulses.

Heretofore various techniques have been used in the analysis of choline. Gravimetric determinations of choline have included potassium triiodide, potassium chloride, gold chloride, and phosphotungstic acid as precipitants. The assay procedure described in the U.S. Pharmacopeia XVII (1965), p. 968, uses a sodium tetraphenylboron solution to precipitate choline chloride. A spectrophotometric assay procedure is described in the National Formulary XII (1965), p. 440, which uses a Reinecke salt to form an insoluble complex with choline. The material being assayed is dissolved in an acetone solution and the absorbance is determined in a suitable photoelectric colorimeter with a filter having maximum transmission at about 520 $\mu$.

U.S. Pat. No. 3,429,785 discloses a liquid organic ion exchange electrode wherein ionic exchange occurs at the interface between an organic ion exchanger liquid and an aqueous test solution. The electropotential developed at this interface is sensed by the internal reference electrode and finally recorded on a electrometer. The electrode was further improved by R. J. Settzo et al. as described in U.S. Pat. No. 3,448,032 by placing an organophilic-hydrophobic porous membrane between the organic ion exhanger liquid and the aqueous test solution. This selectively permeable membrane is substantially impermeable to the aqueous phase and preferentially permeable to the organic phase, such that, when the electrode is dipped into an aqueous test solution, the interface at which ion exchange occurs is located in the proximity of the outer surface of the membrane. Liquid ion exchange electrodes are available commercially to determine the concentration of chloride, nitrate, perchlorate, potassium, calcium and bivalent cations ($Ca^{++}$ and $Mg^{++}$). However, these electrodes have not been able to determine the concentration of an organic species.

Quite surprisingly I have now discovered a liquid ion exchange electrode capable of measuring the concentration of cations of choline and its esters in an aqueous solution. The electrode is selective to these cations as compared to sodium, potassium or ammonium ions. Its response time compares favorably to that of any good pH electrode.

In accordance with the present invention I have discovered an electrode for measuring the concentration of cations of choline and its esters in an aqueous solution comprising a liquid organic phase containing an ion exchange material having the formula $[(CH_3)_3NCH_2CH_2OR]^+[B(C_6H_4X)_4]^-$ wherein X is chlorine or phenoxy, R is hydrogen or

and R' is lower alkyl or phenyl; a means for so containing the organic phase as to provide an interface for ion exchange contact between said organic phase and the aqueous solution; and an internal reference electrode element in electrical contact with an organic phase.

This invention is more clearly understood from the following description taken in conjunction with the accompanying drawing in which.

Figure 1:
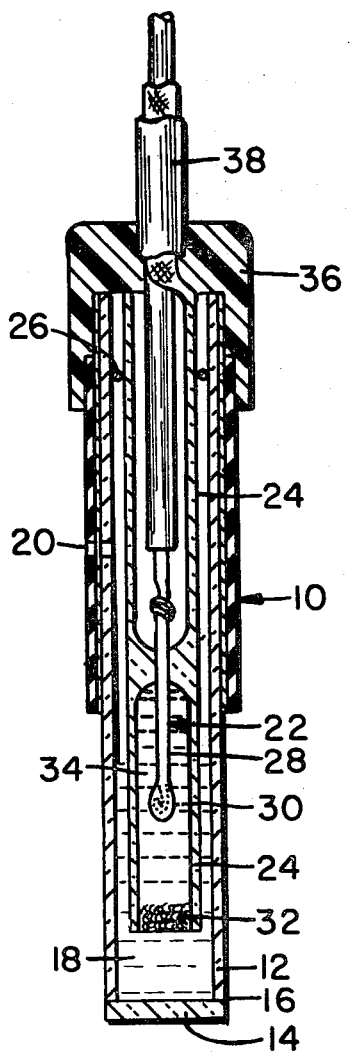
FIG. 1 is a cross-sectional view of a representative electrode formed according to the principles of the present invention.

Referring now to the drawings, in the embodiment illustrated by FIG. 1, the ion exchange electrode 10 of the present invention is comprised of an electrically insulating container such as an outer glass tube 12 having an opening at each end thereof. One end of the glass tube 12 is tightly capped with a substantially chemically inert porous membrane 14 which is attached to the glass tube 12 by a suitable means such as a solder glass 16 or directly by a glass to glass seal. The interior portion of the glass tube 12 is filled with an organic ion exchanger liquid 18. When assembled and in actual use the ion exchanger liquid is in contact with and fills the pores of the membrane 14. In order to permit the ion exchanger liquid 18 to very gradually flow through the pores of the membrane 14, a vent 20 may be placed in the glass tube 12 to prevent the formation of a vacuum. Immersed directly in the ion exchanger liquid 18 and electrical contact therewith is an internal reference electrode 22 which is preferably of the silver-silver chloride type. The internal reference electrode 22 is made up of an inner glass tube 24 held in place by means of an O-ring 26, a platinum wire 28 and a silver-silver chloride coating 30 and a salt bridge 34 consisting of saturated potassium chloride solution which may be gelled with gelatinous silica or agar. A plug 32 of a suitable inert material such as glass wool soaked in a salt bridge solution can be placed at the bottom of the glass tube 22 to enhance the mechanical stability. The end of the tube 12 is suitable capped with lid 36 which acts both as a closure and a support for electrically conductive lead 38 which forms part of the internal electrode 22. The electrode of FIG. 1 is employed by contacting the outer surface of the membrane 14 with an aqueous test solution. Membrane 14 provides a mechanical support which retains the ion exchanger liquid 18 within the tube 12 while also permitting the formation of an active ion exchange liquid-liquid interface on the outer surface of the membrane 22 between the ion exchange liquid and the aqueous test solution.

The ion exchangers useful in the novel electrode sensitive to choline and its esters are substituted tetraphenylborates. These compounds may be represented by the general formula $[(CH_3)_3NCH_2CH_2OR]^+[B(C_6H_4X)_4]^-$ wherein X is chlorine or phenoxy, R is hydrogen or

and R' is lower alkyl or phenyl. An essential property of the ion exchanger is that it must be water soluble. In the copending application of Baum et al. Ser. No. 830,040, filed June 3, 1969, for a potassium ion substituted tetraphenylborate, some principles were enumerated which are also applicable to the present electrode. It was generally found that the nonsubstituted salts are very insoluble in the commonly used organic solvents for preparing liquid ion exchanger electrodes. Certain substitutions on the phenyl rings of the tetraphenylborate were found to enhance the solubility of the salt in common organic solvents. Substitution of methyl, methoxy or chlorine for hydrogen in the para position of just one phenyl ring did not significantly alter the solubility of the alkali salt in organic solvents. However, when chlorine is placed in the para position of each of the four phenyl rings the resulting choline salt is soluble in a large number of organic solvents such as alcohols, nitrobenzene, di-n-butylphthalate, cyclohexanone and tricresylphosphate. Also substitution of an organic radical such as methyl, methoxy or phenoxy group in each of the four para positions produces salts that are soluble in some of these solvents. However, the tetra-p-methyl and tetra-p-methoxy substituted exchangers produced inferior electrodes. Furthermore, substitution of iodine or bromine produces compounds which are not sufficiently stable, whereas the fluoride compound is difficult to prepare. The only exchangers which have been found to give satisfactory results are the tetra-p-phenoxy and the tetra-p-chloro compounds.

A very important role in controlling the performance of the organic ion exchange electrode is played by the solvent system. The system must be liquid at room temperature although individual components do not have to be. It must be a good solvent for the ion exchanger and at the same time it must be substantially water immiscible. The solvent should have a high dielectric constant and a viscosity such that the organic phase is able to saturate and pass through the membrance. The latter property can be adjusted by using a mixture of solvents. The preferred solvents for the exchanger are nitroaromatic compounds The compounds generally have the formula

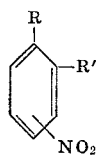

wherein R is hydrogen, alkyl containing 1–14 carbon atoms, lower alkoxy, and alkylcarboxy and R' is hydrogen and methyl. Representative compounds include nitrobenzene; 1,2-diemthyl-4-nitrobenzene; p-hexylnitrobenzene; 1,2-dimethyl-3-nitrobenzene, decyl-p-nitrobenzoate, and octyl-p-nitrophenyl ether. Frequently, the nitroaromatic compounds are sued in mixtures such as for example a 1:1 mixture of 1,2-diemthyl-4-nitrobenzene and p-hexylnitrobenzene. Higher nitrated solvents, e.g., those containing more than one nitro group, tend to be explosive and should be avoided. The ratio of exchanger to solvent is to a large extent limited by the solubility of the exchanger in the solvent which is usually in the range of 0.5–10 percent by weight. Typically the organic phase contains about 2 percent by weight of the organic ion exchanger in the solvent.

Figure 2:
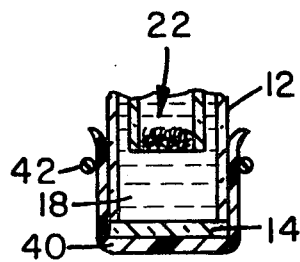
FIG. 2 is a fragmented cross-sectional view of a modified electrode for use in measuring ion concentrations of blood serums.

Referring now to FIG. 2, in measuring the acetylcholine ion concentration of blood serums, the electrodes must be further modified in order to give satisfactory results. Failure to modify the electrode produces anomalous emf readings. As illustrated, the electrode has essentially a configuration similar to FIG. 1. The porous organophilic-hydrophobic membrane 14 is attached to the outer tube 12 so as to form a container for the organic ion exchanger liquid 18, and the internal reference electrode 22 is in electrical contact with the exchanger liquid 18. The modification involves placing a dialysis membrane 40, held in place by a suitable means such as an O-ring 42, directly in front of the organophilic-hydrophobic porous membrane 14, to prevent the samples of blood serum from contaminating the liquid organic ion exchanger sensor. An example of a suitable dializer is a cellophane membrane such as used for dializer tubing which has a wall thickness of about 0.008 inches and an average pore diameter of about 48A units.

A number of ion exchanger electrode assemblies are illustrated by FIG. 1 and FIG. 2 were formed using an organic phase containing various tetraphenylborate salts and solvents and their behavior was determined as will be described in the following examples.

EXAMPLE I

The ion exchanger, choline tetrakis(p-chlorophenyl)borate was prepared by the following procedure. Sodium tetrakis(p-chlorophenyl)borate was prepared by the following procedure. To an etherial solution of the Grignard reagent prepared from 0.29 moles (55.5 grams) of 1-bromo-4-chlorobenzene in 125 ml. of anhydrous diethyl ether, a solution of 0.054 moles (12.43 grams) of tri-n-butylborate in 125 ml. of ether was added dropwise with stirring over a period of one hour. The reaction flask contents were decanted into approximately 200 ml. of a dilute aqueous sodium chloride solution. The upper ether layer was separated and evaporated to dryness yielding the crude sodium tetrakis(p-chlorophenyl)-borate which was dissolved in distilled water and filtered to remove solid impurities. An aqueous solution of 0.001 moles of sodium tetrakis(p-chlorophenyl)borate in 50 ml. of water was mixed with 0.001 moles of choline chloride in 50 ml. of water to give a white flocculent precipitate which was filtered, washed well with hot water and dried to give a fine white powdery material 0.0009 moles which did not melt below 250° C. The ion exchanger in an amount of 1 percent by weight was dissolved in 1,2-diemthyl-3-nitrobenzene.

Construction of the electrode was substantially as shown in FIG. 1. An Ag/AgCl reference electrode was immersed in a saturated KCl solution which contacts the organic ion exchanger liquid at the inside surface of the organophilic-hydrophobic membrane. The sensor also saturates the membrane and makes contact with the aqueous test solution at the outside surface of the membrane at which the potential is established by the activity of the cation in the aqueous phase. A saturated calomel electrode was used as the performance for potential measurements.

Using an expanded scale pH meter the response to various molalities of acetylcholine and choline was determined as shown in the table below.

TABLE I

| Molality | Acetylcholine chloride (mv.) | Choline Chloride (mv.) |
| --- | --- | --- |
| 10⁻¹ | +27 | −3 |
| 10⁻² | −31 | −58 |
| 10⁻³ | −89 | 113 |

These results indicated that the potentials which are developed are related to the logarithm of the concentration of choline and choline esters. It also shows that the selectivity values of acetylcholine/choline is about 13:1.

EXAMPLE II

Following the procedure of example 1, an electrode was prepared in which the organic phase was a 1 percent weight solution of acetylcholine tetrakis-(p-chlorophenyl)borate in 1,2-dimethyl-3-nitrobenzene. The exchanger was prepared as shown in example I with the exception that acetylcholine chloride was substituted for choline chloride.

Figure 3:
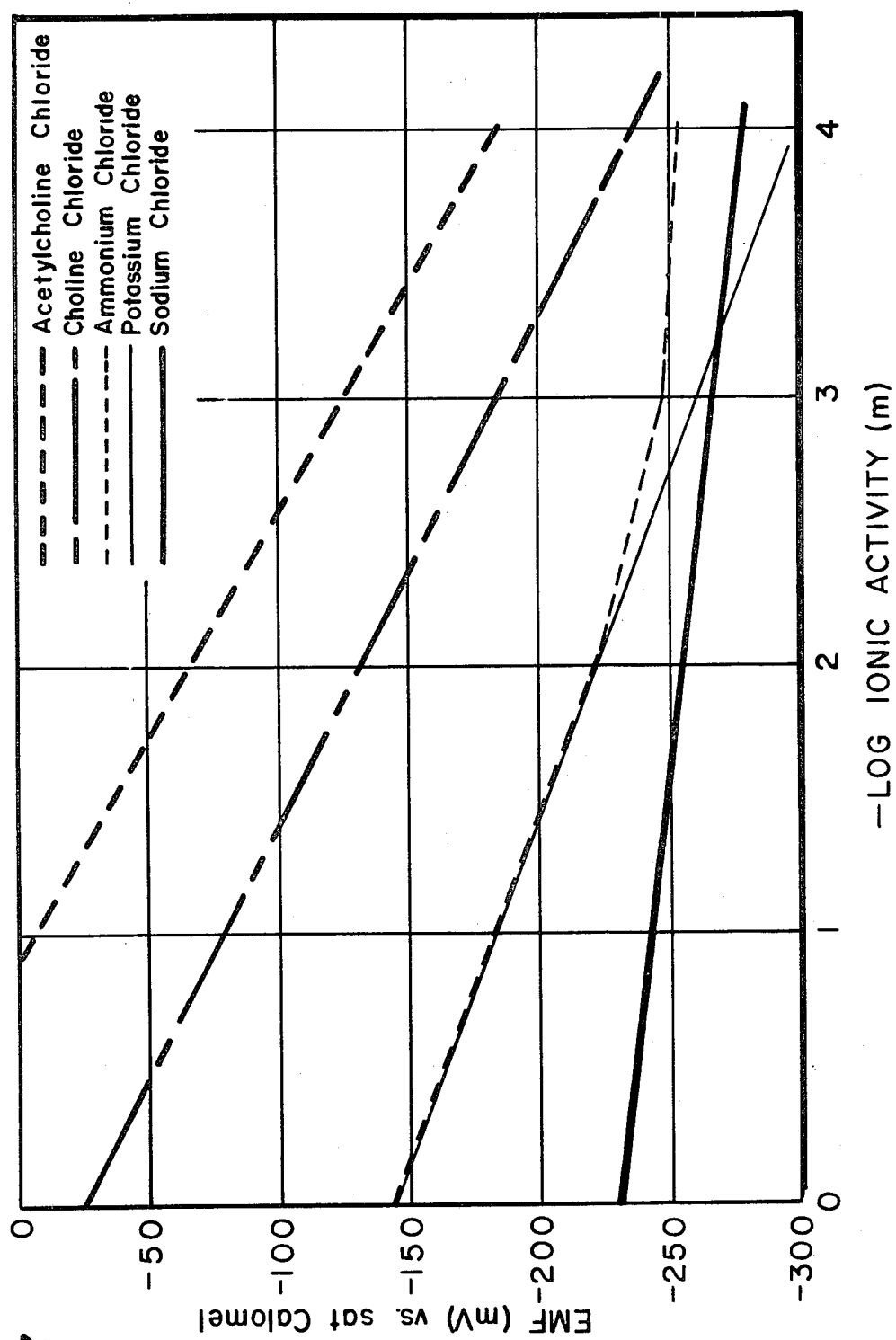
FIGS. 3 and 4 are graphic representations of comparative data obtained by using electrodes as discussed hereinafter.

Selectivity studies were performed using a saturated calomel reference electrode. The high preference of the electrode for the organic cations over the inorganic cations K⁺, MH4⁺ and Na⁺ can be readily seen from FIG. 3. Numerically these results are summarized in table II. The electrode shows a 1,000 to 1 selectivity for acetylcholine over potassium ions and about 10,000 to 1 over sodium ions.

TABLE II

| Cation (M⁺) | Isopotential Selectivity Ratio (K) Kᵃ |
| --- | --- |
| Na⁺ | 1×10⁴ |
| NH₄⁺ | 1×10³ |
| K⁺ | 1×10³ |
| Ch⁺ | 6.6×10² |
| ACh⁺ | 1 |

(a) K is defined herein as the ration of the concentration of acetylcholine to the concentration of the indicated cation that provides the same electropotential response.

The response time of the electrode is particularly rapid even at low organic cation concentrations. The response time to a step log change in concentration is about 10–20 sec. The electrode, however, is rather sluggish towards inorganic cations and response times up to 20 minutes were encountered.

EXAMPLE III

Following the procedure and using the electrode of example II, the responses to various concentrations of esters of choline were determined.

Figure 4:
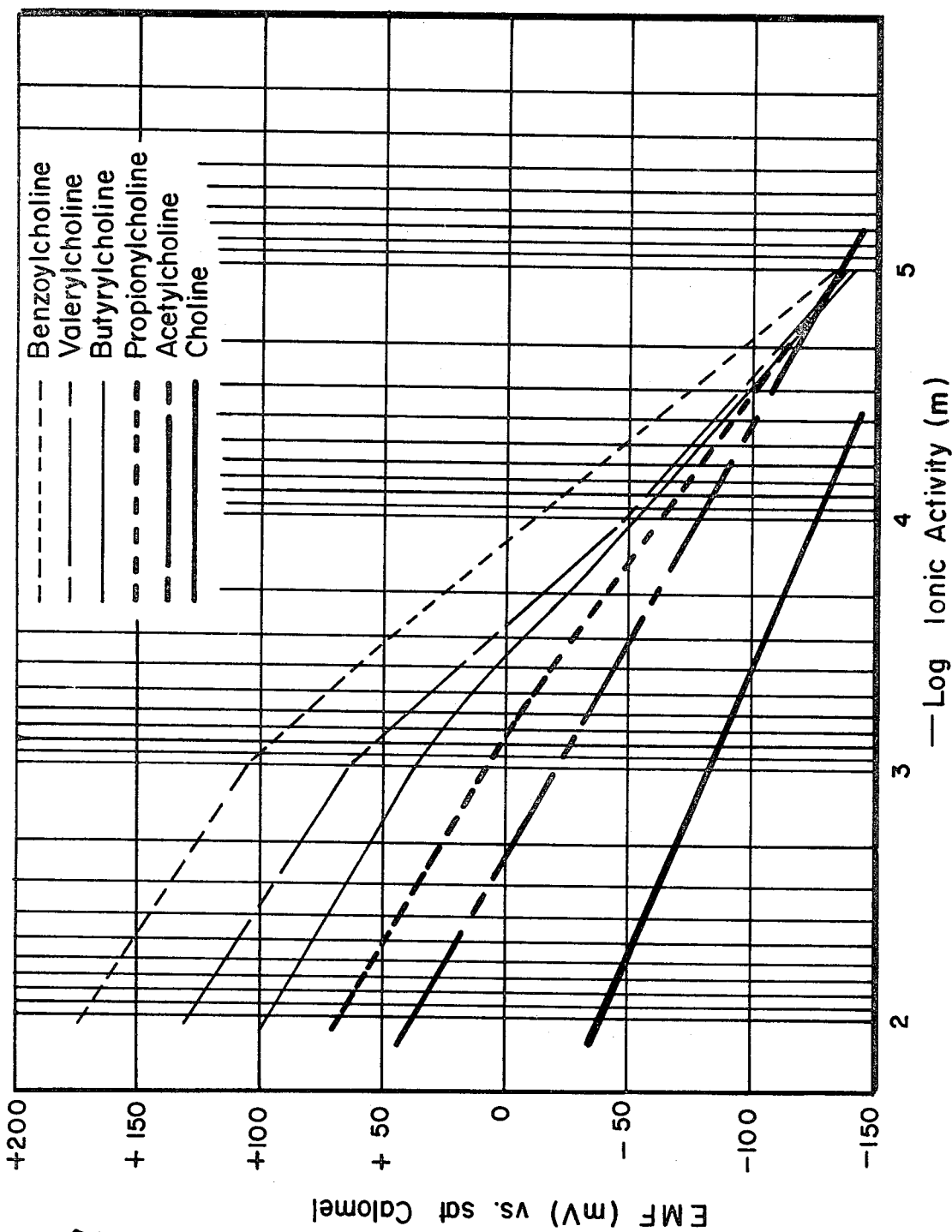

The results are shown in FIG. 4. These indicate that the response of this liquid organic ion exchange electrode increases with the length of alkyl chain of the ester and the highest response was to the ester having the aromatic benzoyl group.

EXAMPLE IV

Following the procedure and using the electrode of example II, as modified by FIG. 2, the electrode and a saturated calomel reference electrode were immersed in 10 ml. of a solution containing $2.0 \times 10^{-3}$ molal acetylcholine chloride in physiological saline buffer. To this solution which is stirred, 1.0 ml. of rabbit blood was injected and the potential between the two electrodes was recorded on a strip chart recorder as a function of time.

The rate of change in potential is converted to the rate of loss of acetylcholine by means of a calibration curve. In 10 minutes the concentration of acetylcholine had decreased to $1.6 \times 10^{-8\&3}$ molal corresponding to the hydrolysis of $0.40 \times 10$ moles of acetylcholine. Thus the cholinesterase activity of one ml. of rabbit blood is 0.40 international units. This procedure for determination of cholinesterase activity was correlated with chlorimetric method of S. Hestrin, J. Biol. Chem., 180,249 (1949).

I claim:
1. An electrode for measuring the concentration of the cations of choline and its esters in an aqueous solution comprising:
   a. a liquid organic phase containing an ion exchange material having the formula $[(CH_3)_3NCH_2CH_2OR]^+[B(C_6H_4X)_4]^-$ wherein X is chlorine or phenoxy, R is hydrogen or

and R' is lower alkyl or phenyl,
   b. a means for so containing the organic phase, as to provide an interface for ion exchange contact between said organic phase and the aqueous solution; and
   c. an internal reference electrode element in electrical contact with the organic phase.

2. The electrode of claim 1, wherein said material is dissolved in a nitroaromatic solvent.

3. The electrode of claim 2, wherein said solvent has the formula

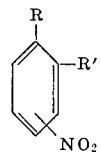

wherein R is a member selected from the group consisting of hydrogen, alkyl containing 1–14 carbon atoms, lower alkoxy and alkylcarboxy, and R' is a member selected from the group consisting of hydrogen and methyl.

4. The electrode of claim 3, wherein said ion exchange material is choline tetrakis(p-chlorophenyl)borate.

5. The electrode of claim 3, wherein said ion exchange material is acetylcholine tetrakis(p-chlorophenyl)borate.

6. The electrode of claim 3 wherein said solvent is 1,2-dimethyl-4-nitrobenzene.

7. The electrode of claim 2 wherein said means includes a container for said liquid organic phase having an opening at a portion and an organophilic-hydrophobic porous membrane disposed in covering relationship across said opening.

8. The electrode of claim 7, wherein said membrane consists of a ceramic material coated with a treating agent to impart the organophilic-hydrophobic property.

9. The electrode of claim 7 wherein a dialysis membrane is positioned in front of and across said porous membrane.

10. The electrode of claim 9 wherein said dialysis membrane consists essentially of porous cellophane.

11. A method of measuring the concentration of choline and its esters in an aqueous solution comprising the steps of
   a. providing a liquid organic ion exchange electrode wherein the liquid organic phase contains an ion exchange material having the formula $[(CH_3)_3NCH_2CH_2R]^+[B(C_6H_4X)_4]^-$ wherein X is chlorine or phenoxy, R is hydrogen or

and R' is lower alkyl or phenyl,
   b. subjecting the aqueous solution to said liquid organic ion exchange electrode and a reference electrode, and
   c. measuring the potential developed between the electrodes.

12. The method of claim 11 wherein said aqueous solution contains acetylcholine.

13. A method of determining the activity of an esterase in an aqueous solution containing acetylcholine and the esterase comprising the steps of
   a. providing a liquid organic ion exchange electrode wherein the liquid organic phase consists essentially of a nitroaromatic solvent and 0.5–10 percent by weight of an ion exchange material having the formula $[(CH_3)_3NCH_2CH_2R]^+[B(C_6H_4X)_4]^-$ wherein X is chlorine or phenoxy, R is hydrogen or

and R' is lower alkyl or phenyl,
   b. subjecting the aqueous solution to said liquid organic ion exchange electrode and a reference electrode,
   c. measuring the potential developed between the electrodes, and
   d. calculating the rate of loss of acetylcholine by enzymatic hydrolysis.

14. The method of claim 13, wherein said esterase is cholinesterase.

15. The method of claim 13, wherein said esterase is acetylcholinesterase.

* * * * *

UNITED STATES PATENT OFFICE
CERTIFICATE OF CORRECTION

Patent No. 3,632,483        Dated January 4, 1972

Inventor(s) George Baum

It is certified that error appears in the above-identified patent and that said Letters Patent are hereby corrected as shown below:

Column 1, line 28, after "520" insert -- m --.

Column 2, line 32, change "suitable" to -- suitably --.

line 38, change "exchanger" to -- exchange --.

line 52, change "soluble" to -- insoluble --.

line 54, after "ion" insert -- sensitive electrode in which the ion exchanger was a potassium --.

Column 3, line 31, change "sued" to -- used --.

line 32, change "diemthyl-" to -- dimethyl- --.

line 33, change "e.g.," to -- i.e., --.

Column 4, line 23, change "performance" to -- reference --.

Column 5, line 30, change "1.6 x $10^{-B\&3}$" to -- 1.6 x $10^{-3}$ --; "0.40 x 10" to -- 0.40 x $10^{-6}$ --.

line 34, change "choloimetric" to -- coloimetric --.

Column 6, Claim 11, line 28, change "$NCH_2CH_2R$]" to -- $NCH_2CH_2OR$] --.

Claim 13, line 48, change "$NCH_2CH_2R$]" to -- $NCH_2CH_2OR$] --.

Signed and sealed this 19th day of September 1972.

(SEAL)
Attest:

EDWARD M. FLETCHER, JR.          ROBERT GOTTSCHALK
Attesting Officer                 Commissioner of Patents